United States Patent
Chan et al.

(10) Patent No.: US 10,700,929 B2
(45) Date of Patent: Jun. 30, 2020

(54) METHODS AND SYSTEMS FOR CONFIGURING A MOBILE ROUTER

(71) Applicant: PISMO LABS TECHNOLOGY LIMITED, Kowloon (HK)

(72) Inventors: Sze Hon Chan, Hong Kong (HK); Ying Kwan, Hong Kong (HK)

(73) Assignee: PISMO LABS TECHNOLOGY LIMITED, Kowloon (HK)

(*) Notice: Subject to any disclaimer, the term of this patent is extended or adjusted under 35 U.S.C. 154(b) by 38 days.

(21) Appl. No.: 16/195,057

(22) Filed: Nov. 19, 2018

(65) Prior Publication Data

US 2019/0116089 A1    Apr. 18, 2019

Related U.S. Application Data

(63) Continuation of application No. 14/421,143, filed as application No. PCT/IB2014/065257 on Oct. 13, 2014, now Pat. No. 10,135,681.

(51) Int. Cl.
*G06F 15/177* (2006.01)
*H04L 12/24* (2006.01)
*H04L 29/08* (2006.01)

(52) U.S. Cl.
CPC ...... *H04L 41/0816* (2013.01); *H04L 41/0803* (2013.01); *H04L 41/0843* (2013.01); *H04L 41/0886* (2013.01); *H04L 67/303* (2013.01); *H04L 67/34* (2013.01)

(58) Field of Classification Search
USPC .......................................................... 709/221
See application file for complete search history.

(56) References Cited

U.S. PATENT DOCUMENTS

| | | | |
|---|---|---|---|
| 4,849,862 A | 7/1989 | Diskin |
| 6,821,310 B2 | 11/2004 | Hedstrom |
| 8,017,073 B2 | 9/2011 | Engelhard |
| 8,032,481 B2 | 10/2011 | Pinckney |
| 8,185,936 B1 | 5/2012 | Reeves |
| 8,643,662 B2 | 2/2014 | Tran |

(Continued)

FOREIGN PATENT DOCUMENTS

| | | |
|---|---|---|
| CN | 101212354 A | 7/2008 |
| DE | 19858310 A1 | 6/2000 |
| DE | 19858310 B4 | 6/2005 |

OTHER PUBLICATIONS

International Search Report of International Application No. PCT/IB2014/065257, dated Nov. 2, 2016.

(Continued)

*Primary Examiner* — Anthony Mejia
(74) *Attorney, Agent, or Firm* — FisherBroyles, LLP

(57) ABSTRACT

The present invention discloses a method, a system and an electronic device for configuring the electronic device. The method and system comprise steps of configuring the electronic device by a profile server. The profile server receives sensor information, determines a profile substantially based on the sensor information, retrieves a configuration based on the profile, and then configure the electronic device substantially based on the configuration. In one variant, the configuration of the electronic device may be performed by a profile management module of the electronic device

20 Claims, 13 Drawing Sheets

(56) References Cited

U.S. PATENT DOCUMENTS

| | | | |
|---|---|---|---|
| 8,838,099 B2* | 9/2014 | Krco | H04W 8/06 455/414.1 |
| 2002/0186664 A1 | 12/2002 | Gibson | |
| 2004/0160335 A1 | 8/2004 | Reitmeier | |
| 2005/0059385 A1 | 3/2005 | Twigg | |
| 2006/0029198 A1 | 2/2006 | Dorneich | |
| 2007/0062513 A1 | 3/2007 | Gagas | |
| 2008/0091761 A1* | 4/2008 | Tsao | G06F 9/526 709/201 |
| 2008/0157959 A1 | 7/2008 | Kuris | |
| 2009/0104939 A1 | 4/2009 | Lee | |
| 2009/0180430 A1 | 7/2009 | Fadell | |
| 2010/0037303 A1 | 2/2010 | Sharif | |
| 2010/0040959 A1 | 2/2010 | Ulrich et al. | |
| 2010/0101418 A1 | 4/2010 | Augustine | |
| 2012/0046040 A1 | 2/2012 | Chatterjee | |
| 2012/0239335 A1 | 9/2012 | Lachapelle | |
| 2012/0275442 A1 | 11/2012 | Malets | |
| 2013/0059609 A1 | 3/2013 | Raento | |
| 2013/0102283 A1 | 4/2013 | Lau | |
| 2013/0167190 A1 | 6/2013 | Jankowski | |
| 2013/0200702 A1* | 8/2013 | Schoppner | G06Q 50/06 307/24 |
| 2014/0040959 A1 | 2/2014 | Oyman | |
| 2014/0089007 A1 | 3/2014 | Sim | |
| 2014/0207282 A1 | 7/2014 | Angle | |
| 2015/0234829 A1 | 8/2015 | Yoshitake | |
| 2015/0355012 A1 | 12/2015 | Gurumohan | |
| 2016/0072674 A1 | 3/2016 | Nolan | |
| 2016/0112262 A1 | 4/2016 | Johnson | |
| 2016/0183037 A1 | 6/2016 | Grohman | |
| 2016/0353353 A1* | 12/2016 | Sung | H04L 12/66 |

OTHER PUBLICATIONS

Written Opinion of the International Searching Authority of International Application No. PCT/IB2014/065257, dated Nov. 2, 2016.
International Preliminary Report on Patentability Chapter I of International Application No. PCT/IB, PCT/IB2014/065257, dated Apr. 18, 2017.
First Office Action of Chinese Patent Application No. 201480081657.3, dated Aug. 2, 2018.
Search Report of Chinese Patent Application No. 201480081657.3, dated Jul. 19, 2018.

* cited by examiner

METHODS AND SYSTEMS FOR CONFIGURING A MOBILE ROUTER

RELATED APPLICATIONS

The present application is a Continuation of U.S. patent application Ser. No. 14/421,143, titled "METHODS AND SYSTEMS FOR CONFIGURING ELECTRONIC DEVICES" filed on Feb. 11, 2015, which claims the benefit under 35 U.S.C. § 120 to International Patent Application No. PCT/IB2014/065257, titled "METHODS AND SYSTEMS FOR CONFIGURING ELECTRONIC DEVICES" filed on Oct. 13, 2014. The foregoing applications are herein incorporated by reference in their entireties.

TECHNICAL FIELD

The present invention relates in general to the field of configuring electronic devices. More particularly, the present invention relates to methods and systems for configuring an electronic device based on sensor information.

BACKGROUND ART

An individual may have certain preferences for using electronic devices, and may want to configure the electronic devices according to their preferences. However, configuring one or more electronic devices manually for different individuals or for different circumstances to use the one or more electronic devices may be troublesome. As environment changes, the one or more electronic devices may need to be reconfigured.

DISCLOSURE OF INVENTION

Summary of Invention

The present invention discloses a method for configuring a first electronic device. The method comprises steps of receiving sensor information, determining a profile substantially based on the sensor information, retrieving a configuration based on the profile and configuring the first electronic device substantially based on the configuration.

According to one of the embodiments of the present invention, the sensor information is either received from a second electronic device or an input of the first electronic device.

According to one of the embodiments of the present invention, the sensor information is received periodically.

According to one of the embodiments of the present invention, the sensor information is received when at least one trigger rule is satisfied. Furthermore, a trigger is created after at least one trigger rule is satisfied.

According to one of the embodiments of the present invention, the sensor information is either received by a profile server or received by a profile management module of the first electronic device.

According to one of the embodiments of the present invention, the profile server or the profile management module of the first electronic device may configure the first electronic device.

According to one of the embodiments of the present invention, the configuration is stored at the first electronic device, at the profile server or at a remote server.

According to one of the embodiments of the present invention, the profile is comprised of a profile identity field, a condition field and a configuration field.

The present invention further discloses a system for configuring the first electronic device. The system comprises a profile server and the first electronic device. The profile server comprises at least one network interface, at least one main memory, at least one secondary storage, at least one processing unit or/and at least one input. The profile server receives the sensor information and determines a profile Substantially based on the sensor information. The profile server then retrieves a configuration based on the profile and con figures the first electronic device substantially based on the configuration. The first electronic device comprises at least one network interface, at least one main memory, at least one secondary storage, at least one processing unit or/and at least one input.

The present invention further discloses an electronic device. The electronic device comprises at least one network interface, at least one main memory, at least one secondary storage, at least one processing unit or/and at least one input. The electronic device receives the sensor information and determines a profile substantially based on the sensor information. The electronic device then retrieves a configuration based on the profile and the electronic device is configured substantially based on the configuration.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a Subroutine, a Subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium.

FIG. 7 illustrates a block diagram of a device according to various embodiments of the present invention. Device 700 comprises processing unit 701, main memory 702, system bus 703, secondary storage 704, network interface 705, and inputs 706. Processing unit 701 and main memory 702 are connected to each other directly. System bus 703 connects processing unit 701 directly or indirectly to secondary storage 704, network interface 705, and user inputs 706. Using system bus 703 allows device 700 to have increased modularity. System bus 703 couples processing unit 701 to secondary storage 704, network interface 705, and user inputs 706. System bus 703 can be any of several types of bus structures including a memory bus, a peripheral bus, a logical bus, and a local bus using any of a variety of bus architectures. Secondary storage 704 stores program instructions for execution by processing unit 701. The scope of the invention is not limited to device 700 having one network interface only, such that device 700 may have one or more network interfaces.

User input 706a could be a sensor, a keyboard, a touch-screen display, a button, a microphone, a video camera, a fingerprint scanner, or any other components that can be used to receive an input, receive information or sense the environment.

In one embodiment, device 700 is embedded in a car seat, and user input 706a is a temperature sensor. When a person sits on the car seat, the temperature sensor detects a rise in temperature, as the body touches the temperature sensor. Processing unit 701 then receives a trigger through user input 706a.

It would be appreciated that the invention is not limited to having a rise in temperature as a trigger. A trigger could be generated by an equipment, an external sensor or an external device connected to or coupled to device 700 through inputs 706a or 706b. For example, the trigger could be a clock signal generated by input 706a where user input 706a can be a timer. Alternatively, a trigger may be implemented by a software, program, firmware, middleware, or hardware description languages. For example, device 700 can be an air purifier and input 706a can be a particle sensor. In another example, input 706b could be a serial console for connecting to an external sensor. Processing unit 701 may receive a trigger from the particle sensor if the number of particles exceeds a threshold. The threshold may be a adjustable value in the program of the particle sensor. There is no limitation that there must be a plurality of inputs. There is no limitation that inputs 706 must be present in device 700. For example, a sensor may be connected to device 700 through network interface 705. In one variant, network interface is not present that a sensor sends sensor information to device 700 through one of inputs 706.

FIG. 1B illustrates a network environment according to various embodiments of the present invention. Device 700 and profile server 121 are connected to interconnected networks 120 such as the Internet. Profile server 121 may configure device 700 through interconnected networks 120 according to a profile. For illustration purposes only, device 700 is an air purifier which has two inputs 706, a keypad and a particle sensor. The air purifier may have two profiles, namely, strong profile and quiet profile. The air purifier may filter less the air in the quiet profile and may filter more the air in the strong profile. Also, profile server 121 may collect the sensor information from the air purifier periodically. Alternatively, the air purifier may send the sensor information to profile server 121 periodically. The sensor information may include the number of particles detected by the air purifier. Profile server 121 determines which profile to be used based on the received sensor information. For example, profile server 121 may determine to use the strong profile when the number of particles exceeds eighty. Then profile server 121 will configure the air purifier according to the strong profile. The process on how to configure the air purifier using a profile will be explained in greater detail in FIG. 1A.

FIG. 1A is a flowchart illustrating a process according to one of the embodiments of the present invention. Profile server 121 receives a trigger in step 101. The trigger may be created by a trigger generation module of profile server 121 or may be first created by device 700 and then received from device 700. Step 101 will be explained in greater detail in FIG. 2A-2C. In step 102, profile server 121 determines a profile based, at least in part, on the sensor information. Step 102 will be explained in greater detail in FIG. 3A. After determining a profile, profile server 121 retrieves configurations corresponding to the profile in step 103. The configurations may be used to configure one or more devices 700. Device 700 is then configured with the retrieved configuration in step 104.

In an exemplary illustration, device 700 is an air purifier which has two inputs 706, a keypad and a particle sensor. The air purifier may have two profiles, strong profile and quiet profile. The air purifier is installed in a room and it is used to control the indoor air quality. The air purifier is connected to profile server 121. The connection can be a wired or wireless connection. When a user is inside the room, the user may first enter his/her identity through the keypad, the air purifier may have different configurations according to the identity of the user. For example, Person A may want the air purifier always operating under a quiet profile regardless of the number of particles detected by the particle sensor. Person B may want the air purifier operating under quiet profile if the number of particles exceeds a threshold. If the identity of the user is unknown, the air purifier will operate under either quiet profile or strong profile depending on the number of particles. The air purifier will always operate under a quiet profile if no person is inside the room. For illustration purposes, profile server 121 may collect sensor information from the air purifier. When Person B enters his identity and the number of particles is below a threshold, profile server 121 receives a trigger in step 101. There are several methods on how a trigger may be created and received by profile server 121. According to one embodiment, the trigger is created by the air purifier. According to another embodiment, the trigger is created by a module of profile server 121. Then profile server 121 determines a profile based on the sensor information in step 102. In step 103, profile server 121 retrieves the configurations based on the determined profile. Profile server 121 may then configure the air purifier with the retrieved configurations in step 104 for filtering the air.

In one variant, the air purifier may use various methods to authenticate a user. For example, input 706 may be a fingerprint scanner. Then a user is authenticated by his fingerprint. Also, input 706 may be a microphone. The air purifier may authenticate a user from his voice. Alternatively, input 706 may connect to an external device. The external device could be a device owned by a user, and may allow the air purifier to authenticate the user. For example, input 706 is connected an external terminal. The air purifier may authenticate a user through a user login of the external terminal. The user login can be performed by entering a username and password, a user code, or anything that can be used to authenticate a user.

FIG. 2A is a flowchart illustrating one of the embodiments of a sub-process for receiving a trigger corresponding to step 101. In one variant, device 700 may send the sensor information to profile server 121 periodically at a monitoring time interval. In step 201, device 700 determines whether the monitoring time interval has expired. If the monitoring time interval has not expired yet, device 700 waits for a time period in step 202. If the monitoring time interval has expired, device 700 will collect the sensor information in step 203. In step 204, device 700 sends the collected sensor information to profile server 121. Device 700 may perform the process in FIG. 2A periodically. The monitoring time interval may be in the range of few milliseconds to a few hours. In one example, monitoring time interval is set to three seconds. Then device 700 may collect and send the sensor information to profile server 121 every three seconds. After receiving the sensor information, profile server 121 may determine whether to create a trigger according to trigger rules. The trigger rules may specify the conditions when a trigger may be created. The trigger rules may be stored locally or remotely. The rules may be pre-defined by a manufacturer, user, or administrator of the sensor or the device. For example, profile server 121 may create a trigger if the number of particles has increased and exceeded a threshold.

For illustration purposes, device 700 is an air purifier. Then the air purifier may collect and send the sensor information to profile server 121 periodically at a monitoring time interval. The monitoring time interval, for illustration purposes, is set to three seconds. Person A has logged on and the air purifier has been operating in a quiet profile. The air purifier may collect the sensor information from the keypad and the particle sensor every three seconds in step 203. The air purifier may then send the collected sensor information to profile server 121 in step 204. A trigger rule may specify that a trigger is created if Person A has logged on and the number of particles exceeds a threshold. Then the trigger generation module of profile server 121 creates a trigger and the trigger is sent to a trigger recipient module of profile server 121. Also, profile server 121 determines which profile should be used based on the collected sensor information. For illustration purposes, profile server 121 determines to use a strong profile. Then profile server 121 retrieves configurations based on the strong profile. Therefore, the air purifier is configured according to the configurations corresponding to the strong profile.

In one variant, the air purifier may compress and encrypt the sensor information before sending the sensor information. For example, the air purifier sends the sensor information to profile server 121 every five seconds. The sensor information may include CPU loading, storage usage, information collected from the keypad and the particle sensor, etc. Considering the bandwidth and resources allocated to the air purifier is limited, it is preferred to reduce the size of the sensor information. Therefore, the sensor information may be compressed and encrypted. In step 204, the air purifier sends the compressed and encrypted sensor information to profile server 121. So one of the benefits of performing compression and encryption is to save bandwidth and network resources. Another benefit is that the sensor information can be protected by data encryption.

FIG. 2B is a flowchart illustrating one of the embodiments of a sub-process for receiving a trigger corresponding to step 101. FIG. 2B is similar to FIG. 2A but step 211 is inserted between step 203 and step 204. In one variant, the trigger rules are stored locally at device 700 and the trigger is created by device 700. Device 700 collects the sensor information in step 203. In step 211, device 700 determines if any trigger rule is satisfied to create a trigger for sending the sensor information. If one or more trigger rules are satisfied, device 700 will create a trigger for sending sensor information. In step 204, device 700 sends the sensor information to profile server 121. If no trigger rule is satisfied, device 700 will not send the collected sensor information and continue to perform step 201. For illustration purposes, the trigger rules are stored in the air purifier locally. One of the trigger rules specifies that a trigger is created if Person A has logged on and the number of particles exceeds a threshold. Since the trigger rules are stored locally and accessible by the air purifier, the air purifier may create a trigger according to the trigger rule when Person A has logged on and the number of particles exceeds a threshold. The air purifier then send the collected sensor information to profile server 121 in step 204. Alternatively, if no trigger rule is satisfied in step 211, the air purifier will continue to perform step 201. As the trigger is created by the air purifier, profile server 121 may not need the trigger generation module.

FIG. 2C is a flowchart illustrating one of the embodiments of a sub-process for receiving a trigger corresponding to step 101. In one variant, profile server 121 may collect the sensor information periodically from device 700. For illustration purposes, device 700 is an air purifier. Step 101 has been started in step 221. In step 222, profile server 121 collects the sensor information from the air purifier. The sensor information may include information collected from the keypad and the number of particles. In step 223, profile server 121 determines whether to send a trigger according to trigger rules. If a trigger rule is satisfied in step 223, profile server 121 sends a trigger in step 224 before performing step 225. If no trigger rule is satisfied in step 223, profile server 121 continues to perform step 225. In step 225, profile server 121 determines whether to stop collecting the sensor information. If profile server 121 decides to stop collecting the sensor information in step 225, the process is ended in step 227. Otherwise, profile server 121 continues to wait for monitoring time interval in step 226 and then perform step 222 again.

In one example, one of the trigger rules specifies that a trigger is created if the number of particles has doubled within five minutes regardless the identity of a user. Profile server 121 collects the sensor information from the air purifier in step 222. When it is found that the number of particles has doubled within five minutes, the trigger generation module of profile server 121 determines to create a trigger in step 223. Then the trigger generation module of profile server 121 sends the trigger to a trigger recipient module of profile server 121 in step 224.

In another example, one of the trigger rules specifies that a trigger is created if Person A has logged on and the number of particles exceeds a threshold. For example, the threshold is set to eighty. When Person A has logged on, the number of particles is fifty. Since the number of particles is below a threshold, no trigger rule is satisfied. Then profile server 121 determines not to send a trigger in step 223. Furthermore, profile server 121 will continue to perform steps 226 and 222 if profile server 121 decides not to stop collecting the sensor information in step 225.

One of the benefits of the embodiment illustrated in FIG. 2C is that profile server 121 may stop to collect the sensor information from device 700 in step 227 as long as profile server 121 decides to stop collecting the sensor information in step 225. Comparatively, for the embodiment illustrated in FIG. 2A, profile server 121 has no need to inform device 700 to stop collecting sensor information in the process illustrated in FIG. 2C.

There is one major difference between the embodiments illustrated in FIG. 2A and FIG. 2C. For the embodiment illustrated in FIG. 2A, device 700 may send the sensor information periodically to profile server 121. Comparatively, for the embodiment illustrated in FIG. 2C, profile server 121 may collect the sensor information periodically from device 700. The period of time is based on the monitoring time interval. It may be noted that the process illustrated in FIG. 2C profile server 121 proactively collect the sensor information from device 700 periodically while the process illustrated in FIG. 2A device 700 proactively sends the sensor information periodically.

According to one of the embodiments, input 706 may connect to an electronic device which is separated from device 700. The electronic device may be mounted on a wall, placed on a table or may be at any location where it is capable of collecting the sensor information. The electronic device may connect to device 700 via one of inputs 706 and the connection between the electronic device and device 700 may be wired or wireless. For example, input 706 may be an universal serial bus (USB) interface, a serial bus interface, an Ethernet interface or a cable interface that can provide communications between the electronic device and device 700. Alternatively, the electronic device may be wirelessly connected to device 700. Then input 706 may be an interface for wireless communications such as an infrared port interface, radio frequency interface, WiFi interface, Bluetooth interface, etc. Device 700 may collect the sensor information from the electronic device and send the sensor information to profile server 121 periodically. Alternatively, profile server 121 may collect the sensor information periodically from device 700. For illustration purposes, device 700 is an air purifier and the electronic device is a particle sensor. The particle sensor is not attached, mounted or coupled to the air purifier and sends sensor information wirelessly to the air purifier via Bluetooth. In one variant, the air purifier may collect the sensor information from the particle sensor periodically. The collected sensor information is then sent to profile server 121 periodically according to the process as illustrated in FIG. 2A. On the other hand, profile server 121 may periodically collect the sensor information from the air purifier according to the process as illustrated in FIG. 2C. The sensor information may include the number of particles which is detected by the particle sensor.

In one variant, profile server 121 may collect the sensor information directly from the electronic device via input 806. The electronic device may be separated from device 700 and profile server 121. The electronic device may communicate with profile server 121 using a wired or wireless connection through input 806. Input 806 may be an USB interface, a serial bus interface, an Ethernet interface or a cable interface that can provide communications between the electronic device and profile server 121. Alternatively, profile server 121 may wirelessly communicate with the electronic device. Then input 806 may be an interface for wireless communications such as an infrared port interface, radio frequency interface, WiFi interface, Bluetooth interface, etc. The electronic device may send the sensor information periodically to profile server 121. Alternatively, profile server 121 may collect the sensor information from the electronic device periodically. In another variant, the trigger rules are store locally at the electronic device. Then the electronic device may create a trigger for sending sensor information to profile server 121 according to the process as illustrated in FIG. 2B.

FIG. 3A is a flowchart illustrating one of the embodiments of a sub-process for determining a profile corresponding to step 102 of FIG. 1A. When a trigger is received in step 101, profile server 121 will receive the sensor information in step 301. In step 302, profile server 121 looks up a profile based on the sensor information. The profiles may be looked up from a local storage medium such as secondary storage 804 or main memory 802 or may be looked up from a remote storage medium. If no profile corresponding to the sensor information is found in step 303, profile server 121 may determine to use a default profile in step 305. A default profile may be an existing profile as specified by a user. For illustration purposes, the air purifier has two profiles, strong profile and quiet profile. There are four conditions where a strong profile should be used. The user may specify to use a quiet profile if no condition is satisfied to use a strong profile. Hence, the quiet profile can be considered as a default profile of the air purifier. Alternatively, a default profile can be another profile created by the user of the air purifier such that the default profile is used if no condition is satisfied to use strong or quiet profiles. If no profile is found in step 303 and profile server 121 determines to use a default profile in step 305, profile server 121 will retrieve the default profile in step 304. On the other hand, if a profile is found in step 303 such as a strong profile, profile server 121 will retrieve the strong profile in step 304. Profile server 121 then will continue to perform step 103. Step 304 will be explained in greater detail in FIG. 3B.

FIG. 3B is a flowchart illustrating one of the embodiments of a sub-process for retrieving a profile corresponding to step 304 of FIG. 3A. Profile server 121 determines the location of the profile in step 311. If profile server 121 determines that the profile is located locally in step 312, it will retrieve the profile locally from secondary storage 804 or main memory 802 in step 314. Alternatively, if the profile is not located locally, profile server 121 will retrieve the profile from a remote server or remote storage unit in step 313.

A profile can be created and stored by a user using a terminal such as a laptop computer, a desktop computer, a tablet, a smart-phone, an LCD display, or any other device that can be used to provide a user interface to the user. The terminal can be connected to profile server 121 using a wired or wireless connection through network interface 805. The user can also create a profile with corresponding configurations by using a web interface, an application programming interface, a command line interface, or a console. When the profile is created, the configurations corresponding to the profile may also be specified.

In one embodiment, profiles are independent from the trigger rules. The conditions of using a profile may not be related to the trigger rules. A trigger is created if any of the trigger rules is satisfied. For illustration purposes, a trigger is created if any of the following trigger rules is satisfied: (i) the number of particles exceeds one hundred; (ii) the number of particles doubles within five minutes; (iii) there is a change of user who logged on; or (iv) Person A has logged on and the number of particles exceeds eighty. Alternatively, the air purifier has two profiles, strong profile and quite profile. For illustration purposes, profile server 121 will determine to use a strong profile under any of the following conditions: (i) Person B has logged on and the number of particles exceeds fifty; (ii) the number of particles exceeds eighty; or (iii) Person A has logged on and the number of particles exceeds seventy.

FIG. 6 illustrates the content of a profile according to one of the embodiments of the present invention. Profile 600 may comprise of identity field 601, condition field 602 and configurations field 603. Identity field 601 may include an identity of a profile. The identity of a profile may be a string, a pre-defined code, user code or anything that can identify a profile. In one variant, the identity of a profile is a unique information. For example, there may be many profiles in profile server 121. Profile server 121 may look for a profile based on the profile identity.

Condition field 602 specifies values used for determining a profile in step 102. Profile server 121 uses condition field 602 to look up a profile in step 302. The information stored in condition field 602 may be in different format, such as a uniform resource locator (URL), a string, a filename, binary data, etc. For illustration purposes, an air purifier which is connected to profile server 121 has two profiles, strong profile and quiet profile. There could be three conditions for an air purifier to use a strong profile: (i) Person B has logged on and the number of particles exceeds fifty; (ii) the number of particles exceeds eighty; or (iii) Person A has logged on and the number of particles exceeds seventy. Alternatively, the air purifier may use a quiet profile if no condition is satisfied to use a strong profile. For example, the air purifier may use a quiet profile if the number of particles is twenty.

Profile server 121 could perform step 302 by executing programs. Data used by the programs may be specified in condition field 602. Table 0001 illustrates an example of the content in condition field 602 of the strong profile.

TABLE 0001

Condition field 602

| Column | Content |
| --- | --- |
| 0 | Person B |
| 1 | 50 |
| 2 | 80 |
| 3 | Person A |
| 4 | 70 |

The pseudo code shown below provides an example on how profile server 121 determining a profile. In GetValue method, profile server 121 retrieves the value stored in condition field 602. For example, when column equals to zero, GetValue method will return 'Person B'. When column equals to one, GetValue method will return '50'. The returned value of GetValue method is used by Strong_profile method. Strong_profile method illustrates the three conditions where the strong profile is used. For example, when column equals '2', GetValue method will return '80' and if the number of particles exceeds eighty, the strong profile is used. Also, when column equals '0' and '1', GetValue method will return 'Person B' and '50' respectively and if Person B has logged on and the number of particles exceeds fifty, the strong profile is used. Furthermore, when column equals '3' and '4', GetValue method will return 'Person A' and '70' respectively and if Person A has logged on and the number of particles exceeds seventy, the strong profile is used. Alternatively, the quiet profile is used if no condition is satisfied to use the strong profile.

```
GetValue(column)
{
    value = Condition_field(column);
    return value;
}
Strong_profile( )
{
    if current user id = GetValue(0) AND current number of particles > GetValue(1)
        then use strong profile;
    else if current user id = GetValue(3) AND current number of particles >
```
GetValue(4)
```
        then use strong profile;
    else if current number of particles > GetValue(2)
        then use strong profile;
    else
        use quiet profile;
}
```

It is to be understood that any programming language may be used to create a program from the pseudo code. Also, the program may be stored in main memory, secondary storage of profile server 121 or any computer readable storage medium which is accessible by profile server 121.

Configuration field 603 specifies configurations of device 700 corresponding to the profile. The data stored in configuration field 603 may include a uniform resource locator (URL), a string, a filename, binary data or anything that can specify the configurations of device 700. For example, if the configurations of device 700 are stored in a file, configuration field 603 specifies the location of the file. For illustration purposes, a fan-based ionizer is installed in the air purifier. The function of the fan-based ionizer is to filter the air. In the quiet profile, the fan-based ionizer may be set to a low speed so that the air purifier filters less the air. In the strong profile, the fan-based ionizer may be set to a high speed so that the air purifier filters more the air. The configuration field 603 of a quiet profile may specify that the speed of the fan-based ionizer is set to low so that the air purifier filters less the air.

FIG. 4 is a flowchart illustrating one of the embodiment of a sub-process for retrieving configurations corresponding to step 103 of FIG. 1A. When a profile is determined in step 102, profile server 121 retrieves the determined profile in step 304. In step 401, profile server 121 locates configurations based on the profile. Then profile server 121 retrieves the configurations in step 402. In step 104, profile server 121 configures device 700 with the retrieved configurations.

For illustration purposes, device 700 is an air purifier. The air purifier is connected to profile server 121. Profile server 121 will determine the use of a strong profile in step 102. In step 304, profile server 121 retrieves the strong profile. In step 401, profile server 121 locates the configurations of the air purifier based on the strong profile. After performing step 401, profile server 121 will retrieve the configurations from the strong profile in step 402. If the configuration of the air purifier in a strong profile is to filter more the air, profile server 121 will configure the air purifier to filter more the air in step 104.

FIG. 5 is a flowchart illustrating one of the embodiments of a sub-process for configuring the device corresponding to step 104 of FIG. 1A. Profile server 121 starts the configuration process in step 501. In step 502, profile server 121 configures one setting or a group of settings of device 700. If all the settings are configured in step 503, the configuration process will end in step 504. Otherwise, profile server 121 may continue to perform step 502.

For illustration purposes, device 700 is an air purifier. The air purifier is connected to profile server 121. Profile server 121 will determine the use of a strong profile or not. Profile server 121 may configure the air purifier based on the strong profile. The configuration process starts in step 501. Profile server 121 configures the air purifier so that the air purifier is able to filter the air in step 502. When all the settings are configured in step 503, the configuration will end in step 504.

According to one of the embodiments of the present invention, profile server 121 is connected to a plurality of network elements, such as, a plurality of network enabled air purifiers distributed in a residential building. A plurality of profiles are stored in profile server 121. Profile server 121 may receive the sensor information periodically from the air purifiers as profile server 121 is connected to the plurality of air purifiers. Profile server 121 may receive more than one trigger from the air purifiers. For illustration purposes, profile server 121 is connected to two air purifiers, air purifier A and air purifier B. The trigger rules may be stored locally in air purifier A and air purifier B respectively. So air purifier A and air purifier B are able to send triggers to profile server 121 if any trigger rule is satisfied in step 211. In one example, profile server 121 receives two triggers from air purifier A and air purifier B in step 101. Then profile server 121 determines to use respective profiles for air purifier A and air purifier B in step 102 based on the sensor information received from air purifier A and air purifier B respectively. In step 103, profile server 121 retrieves respective configurations for air purifier A and air purifier B based on their profiles. As a result, air purifier A and air purifier B are configured with the respective configurations in step 104.

In one variant, profile server 121 configures all the plurality of air purifiers when some of the plurality of air purifiers satisfy a condition. For illustration purposes, the condition can be if there is ten percent of all connected air purifiers in which the number of particles exceeds ten, profile server 121 will determine to use a strong profile for all the air purifiers. For example, profile server 121 is connected to one hundred air purifiers. Profile server 121 may receive the sensor information periodically from the air purifiers and the sensor information includes the number of particles collected by the air purifiers. When profile server 121 finds that ten of the one hundred air purifiers detecting the number of particles exceeds ten, profile server 121 determines to configure all the air purifiers using a strong profile. Therefore, some of the air purifiers are configured using the strong profile even the numbers of particles detected by these air purifiers are less than ten. In one variant, the air purifiers are configured with the same profile. For example, profile server 121 has two profiles, strong profile and quiet profile. The profiles are stored in profile server 121 but are not accessible by the air purifiers. If profile server 121 determines to use the strong profile, profile server 121 will configure the air purifiers using the strong profile. In another variant, the air purifiers are configured using their respective profiles. If profile server 121 determines to use the strong profile, profile server 121 will use corresponding strong profile of each air purifier to configure the air purifier.

FIG. 9 illustrates a network diagram according to various embodiments of the present invention. Profile server 121, laptop 902, server 903, router 904 and mobile router 905 are connected to interconnected networks 901 such as the Internet. Since profile server 121 is connected to laptop 902, server 903, router 904 and mobile router 905 through interconnected networks 901, laptop 902, server 903, router 904 and mobile router 905 may be configured by profile server 121 through interconnected networks 901.

For illustration purposes, mobile router 905 is configurable by profile server 121. When the monitoring time interval has expired, mobile router 905 will collect and send sensor information to profile server 121 in steps 203 and 204. If the monitoring time interval has not expired yet, mobile router 905 waits for a time period in step 202. Alternatively, profile server 121 may collect the sensor information from mobile router 905 periodically in step 222. For example, if the monitoring time interval is set to fifty milliseconds, then profile server 121 will receive the sensor information from mobile router 905 every fifty milliseconds. Those who are skilled in the art would appreciate that there are myriad sensor information can be collected from a mobile router. Information collected or generated by processing unit of the mobile router may also be used as sensor information. For example, CPU loading, Global Positioning System (GPS) location data, error rates, packet latency, packet jitter, quality of service, bandwidth, bit error rate, packet error, session information, client information, etc.

After profile server 121 has collected the sensor information in step 222, profile server 121 determines to create a trigger if any of trigger rules is satisfied in step 223. The trigger may be created by the trigger generation module of profile server 121 and received by the trigger recipient module of profile server 121. Alternatively, the trigger may be created by mobile router 905 in step 211 and received by profile server 121 in step 101. For illustration purposes only, a trigger is created if any of the following trigger rules is satisfied: (i) the CPU loading of mobile router 905 exceeds a certain percentage, for example, eighty percent; (ii) the location of mobile router 905 has changed; (iii) the clock of mobile router 905 has just passed a pre-defined time; (iv) mobile router 905 is connected to one or more cellular networks and one of the connected cellular networks has become unavailable; or (v) the latency to a specific IP address measured has been increased substantially, for example, by fifty percent within a period of time.

After profile server 121 has received a trigger in step 101, profile server 121 choose a profile in step 102. For illustration purposes only, mobile router 905 may have four profiles, power saving profile, low bandwidth profile, location A profile and a default profile. When none of power saving profile, low bandwidth profile and location A profile is chosen, the default profile will be used. Mobile router 905 may use the power saving profile in order to save power. For example, mobile router 905 may be configured to reduce the CPU clock frequency if the power saving profile is used. Also, when mobile router 905 uses the low bandwidth profile, the priority of a few applications will be configured to low. The applications may include Skype, Facebook website, Windows Streaming Media, etc. Furthermore, mobile router 905 may use location A profile when mobile router 905 is at location A. For illustration purposes, two SIM cards, SIM card A and SIM card B, are inserted into mobile router 905 so that mobile router 905 is able to connect to one or more cellular networks through the two SIM cards. When mobile router 905 is at location A, the location A profile will be used and mobile router 905 will be then configured to connect to a cellular network through SIM card A. When mobile router 905 is not at location A, the location A profile is not used and mobile router 905 will be configured to use either SIM card A or SIM card B to connect to the same or different cellular network.

In one example, profile server 121 may receive the sensor information from mobile router 905 periodically and the sensor information includes GPS location data of mobile router 905. The location of mobile router 905 has changed to location A such that one of the trigger rules is satisfied. Then profile server 121 receives a trigger and the corresponding sensor information from mobile router 905 in step 101 and step 301 respectively. Profile server 121 then determines to use the location A profile based on the received sensor information such as the GPS location data of mobile router 905 in step 302. Since the location A profile is found in step 303, there is no need to use a default profile in step 305. For illustration purposes only, the location A profile is stored locally in profile server 121. Then profile server 121 retrieves the location A profile locally in step 304. Profile server 121 locates the configurations of mobile router 905 in step 401 based on retrieved profile. For illustration purposes, configuration field 603 of the location A profile specifies the configurations for mobile router 905. Then profile server 121 retrieves the configurations for mobile router 905 from the location A profile in step 402. The configurations for mobile router 905 corresponding to the location A profile may include several settings such as the selection of SIM card A slot, the limitation of transmission speed and the choice of using of 3G or LTE networks, etc. So profile server 121 starts the configuration process in step 501 and configures mobile router 905 according to the location A profile in step 502.

In one variant, profile server 121 can be a module running in mobile router 905, namely, a profile management module. The profile management module could be a code segment, a function, a subprogram, program instructions or software code which are executed by the processing unit of mobile router 905 and is stored in a machine-readable medium such as main memory, secondary storage or devices which are accessible by mobile router 905. The profile management module could also be any other configured circuitry to process information. The administrator of mobile router 905 can configure mobile router 905 to use the low bandwidth profile when mobile router 905 is at location B through the profile management module of mobile router 905. For illustration purposes, the processing unit of mobile router 905 collects and sends the sensor information to the profile management module of mobile router 905 in steps 203 and 204 respectively after the monitoring time interval has expired in step 201. If the monitoring time interval has not expired yet, the processing unit of mobile router 905 will wait until the monitoring time interval expired in step 202. For example, the monitoring time interval is set to twenty milliseconds, then the profile management module of mobile router 905 receives the sensor information every twenty milliseconds. The sensor information may include GPS location data. As the location of mobile router 905 has changed to location B, one of the trigger rules is satisfied. Then the profile management module of mobile router 905 receives a trigger and corresponding sensor information from the processing unit of mobile router 905 in step 101 and step 301 respectively. The profile management module of mobile router 905 then use the low bandwidth profile that is configured by the administrator in step 302. Since the low bandwidth profile is found in step 303, there is no need to use a default profile in step 305. For illustration purposes only, the low bandwidth profile is stored in the main memory of mobile router 905. Then the profile management module of mobile router 905 retrieves the low bandwidth profile from the main memory of mobile router 905 in step 304. Also, the profile management module of mobile router 905 locates the configurations of mobile router 905 in step 401 based on the retrieved profile. For illustration purposes, configuration field 603 of the low bandwidth profile specifies the configurations of mobile router 905. Then the profile management module of mobile router 905 retrieves the configurations of mobile router 905 from the low bandwidth profile in step 402. The low bandwidth profile may configure the following settings: (i) to limit the data transmission speed; (ii) the choice of using 3G or LTE networks; and (iii) the priority of a few applications will be set to low. The applications may include Skype, Facebook website and Windows Streaming Media. The data transmission of these applications may have a low priority. The profile management module of mobile router 905 starts the configuration process in step 501 and configures mobile router 905 according to the low bandwidth profile in step 502.

In one example, mobile router 905 may use the power saving profile when the battery of mobile router 905 has dropped below a pre-defined level for at least a pre-defined period. For example, after the battery of mobile router 905 has dropped below thirty percent for at least ten minutes, a trigger will be created. For illustration purposes, the processing unit of mobile router 905 collects and sends the sensor information to the profile management module of mobile router 905 in steps 203 and 204 after the monitoring time interval has expired in step 201. For example, the monitoring time interval is set to ten seconds. Then the profile management module of mobile router 905 receives the sensor information every ten seconds. The sensor information may include the battery level of mobile router 905. If the battery level has dropped below thirty percent for at least ten minutes, the profile management module of mobile router 905 receives a trigger in step 101. The profile management module of mobile router 905 then uses the power saving profile in step 302 according to the sensor information received in step 301. Since the power saving profile is found in step 303, there is no need to use the default profile in step 305. As the power saving profile is stored in the main memory of mobile router 905, the profile management module of mobile router 905 retrieves the power saving profile from the main memory in step 304. Next, the profile management module of mobile router 905 locates the configurations of mobile router 905 in step 401 based on the retrieved profile. For example, configuration field 603 of the power saving profile specifies the configurations of mobile router 905. Then the configurations of mobile router 905 are retrieved from the power saving profile in step 402. The power saving profile may configure the following settings: (i) to limit data transmission speed; (ii) to reduce CPU clock frequency; (iii) to drop a connection if the connection has been idled for a pre-defined time; and (iv) to suspend the WiFi connections periodically. The profile management module of mobile router 905 configures mobile router 905 according to the power saving profile in step 104.

In one variant, mobile router 905 uses a default profile in step 305 when a profile is not found in step 303. The administrator of mobile router 905 may use the default profile to reset the configurations of mobile router 905. For illustration purposes, the clock of mobile router 905 has is within a pre-defined time period and one of the trigger rules is satisfied if the clock is within a pre-defined time period. Then the profile management module of mobile router 905 receives a trigger and the corresponding sensor information in steps 101 and 301 respectively. The sensor information may include the system time of mobile router 905. The profile management module of mobile router 905 looks up a profile in step 302 but no profile is found in step 303 as profiles are independent from the trigger rules. Therefore, mobile router 905 determines to use the default profile which is stored in the main memory in step 305. Furthermore, mobile router 905 retrieves the default profile from the main memory in step 304. For illustration purposes, configuration field 603 of the default profile specifies the configurations of mobile router 905. So the profile management module of mobile router 905 retrieves the configurations of mobile router 905 based on the default profile in step 103. The default profile may configure the following settings: (i) to restore the data transmission speed which may be limited previously; (ii) to restore the CPU clock frequency; (iii) to extend the period of time that mobile router 905 determines to drop a idled connection; and (iv) to stop the periodic suspension of WiFi connections. In step 104, the profile management module of mobile router 905 configures mobile router 905 according to the default profile.

According to one of the embodiments of the present invention, a company's local area network may be connected to interconnected networks 901 through mobile router 905. The administrator of mobile router 905 may configure mobile router 905 through a web page of mobile router 905. For illustration purposes, mobile router 905 has a staff profile and a default profile. The staff profile is used for deploying mobile router 905 in a business environment that restrictions of usage may be applied. On the other hand, the default profile may be used at home that there could have no usage restriction. A button on the web page allows the administrator to select a profile for mobile router 905. When the administrator selects a profile through the button, a trigger is created. Then mobile router 905 receives a trigger in step 101 and the corresponding sensor information in step 301. The corresponding sensor information is the name of selected profile. There is no limitation that the name is the only sensor information. Location of the mobile router 905, network performance of access network connecting to mobile router 905, loading of processing unit are other examples of possible sensor information for selecting other profiles. In this embodiment, mobile router 905 collects and sends the sensor information in steps 203 and 204 after the administrator has selected a profile, instead of collecting and sending the sensor information after a monitoring time interval. Therefore mobile router 905 does not need to perform steps 201 and 202. So the profile management module of mobile router 905 may not receive the sensor information periodically from the processing unit of mobile router 905. When the administrator has selected the staff profile, mobile router 905 will use the staff profile in step 302. Since the staff profile is found in step 303, the default profile is not needed in step 305. The staff profile may be stored locally in mobile router 905. Then mobile router 905 retrieves the staff profile locally in step 304. In addition, the profile management module of mobile router 905 locates the configurations of mobile router 905 in step 401 based on the retrieved profile. Configuration field 603 of the staff profile may specify the configurations of mobile router 905. Then the profile management module of mobile router 905 retrieves the configurations of the mobile router 905 from the staff profile in step 402. The profile management module of mobile router 905 then starts the configuration process in step 501 and configures mobile router 905 according to the staff profile in step 502.

For illustration purposes, the followings are the settings of configuration field 603 of mobile router 905 under the staff profile:
(i) the WAN IP address of mobile router 905 is set to a static IP address, for example, 1.2.3.4.
(ii) the routing mode is configured to the network address translation (NAT) mode. The IP address, for example, to be assigned for connected network hosts in the corresponding local area network is in the range from 192.168.20.2 to 192.168.20.100.
(iii) bandwidth available for accessing Facebook web site is restricted to 1 Mbps.
(iv) all the traffic to and from web site A is blocked.

Those who are skilled in the art would appreciate that that a profile is not limited to configure IP address, routing mode, bandwidth availability and web site access. For example, the profile may also configure quality of service, service set identifier (SSID), WiFi password and etc.

On the other hand, the administrator of mobile router 905 may select a default profile for mobile router 905 when mobile router 905 is used at home. After the administrator has selected the default profile, a trigger is created. The trigger and corresponding sensor information are received by the profile management module of mobile router 905 in step 101 and 301 respectively. The corresponding sensor information is the name of selected profile. In step 302, mobile router 905 uses the default profile based on the corresponding sensor information. The default profile may be stored locally and was found in step 303. In step 304, the profile management module of mobile router 905 retrieves the default profile locally. The profile management module of mobile router 905 locates the configurations of the default profile in step 401. The configurations of the default profile are specified in the Configuration field 603 of the default profile. So the profile management module of mobile router 905 retrieves the configurations of mobile router 905 from the default profile in step 402. The configurations of mobile router 905 corresponding to the default profile may include several settings. The profile management module of mobile router 905 then starts the configuration process in step 501 and configures the mobile router 905 according to the default profile in step 502.

For illustration purposes, the followings are the settings of configuration field 603 of mobile router 905 under the default profile:
(i) the WAN IP address of mobile router 905 is set to dynamic host configuration protocol (DHCP).
(ii) the routing mode is configured to the NAT mode. A network device connecting to a private network may have a private IP address. A public IP address is assigned to the network device only when the network device is accessing interconnected networks 901 such as the Internet. For example, the IP address range is 192.168.20.0 to 192.168.20.10.
(iii) there is no speed limitation to any IP addresses, websites, domain names or hosts.
(iv) there is no access restriction to any IP addresses, websites, domain names or hosts.

According to one of the embodiments of the present invention, profile server 121 is connected to a plurality of VPN gateways. For illustration purposes, there are six VPN gateways, VPN gateways A-F. There are two profiles, hub-and-spoke profile and full-mesh profile. In the hub-and-spoke profile, profile server 121 creates configurations for VPN gateways A-F respectively in the way that VPN gateway F performs as a hub and VPN gateway A-E perform as spokes. For example, in order for VPN gateway A to send and receive packets with VPN gateway B, the packets have to pass through VPN gateway F. In the full-mesh profile, profile server 121 creates configurations for VPN gateways A-F respectively such that they form a full-mesh. Each of the VPN gateways A-F establishes at least one VPN connection with each other. These two profiles are shown to the administrator of profile server 121 through a user interface. There could be a button on the user interface for selecting a profile. When the administrator of profile server 121 selects a profile through the button, a trigger is created. Then profile server 121 receives a trigger in step 101 and the corresponding sensor information in step 301. The corresponding sensor information, for example, is the name of selected profile. In this scenario, the VPN gateways are not required to perform steps 201-204. So profile server 121 may not receive the sensor information periodically from the VPN gateways. For illustration purposes, the administrator of profile server 121 has selected the full-mesh profile. Then profile server 121 will use the full-mesh profile in step 302. Since the full-mesh profile is found in step 303, the default profile is not needed in step 305. The full-mesh profile may be stored locally in profile server 121. Then profile server 121 retrieves the full-mesh profile locally in step 304. Profile server 121 locates the configurations of the VPN gateways in step 401 based on the retrieved profile. Configuration field 603 of the full-mesh profile may specify the configurations of the VPN gateways. Then profile server 121 retrieves the configurations of the VPN gateways from the full-mesh profile in step 402. The configurations of the VPN gateways corresponding to the full-mesh profile may include several settings such as an encryption method, authentication information, etc. So profile server 121 starts the configuration process in step 501 and configures the VPN gateways according to the full-mesh profile in step 502.

FIG. 8 illustrates a block diagram of a profile server according to one of the embodiments of the present invention.

Profile server 800 comprises of processing unit 801, main memory 802, system bus 803, network interface 805 and secondary storage 804. Processing unit 801 and main memory 802 are connected with each other directly. System bus 803 connects processing unit 801 directly with network interface 805, secondary storage 804 and input 806. System bus 803 can be any of the several types of bus structures including a memory bus, a peripheral bus, and a local bus using any of a variety of bus architectures.

Processing unit 801 executes program instructions or code segments for implementing embodiments of the present invention. A processing unit may be a microprocessor, a microcontroller, a digital signal processor (DSP), any combination of those devices, or any other circuitry configured to process information.

Furthermore, embodiments may be implemented by hardware, software, firmware, middleware, microcode, hardware description languages, or any combination thereof. When implemented in software, firmware, middleware or microcode, the program instructions to perform the necessary tasks may be stored in a computer readable storage medium. A processing unit(s) can be realized by virtualization, and can be a virtual processing unit(s) including a virtual processing unit in a cloud-based instance.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Alternatively, hardwired circuitry may be used in place of, or in combination with, software instructions to implement processes consistent with the principles of the invention. Thus, implementations consistent with principles of the invention are not limited to any specific combination of hardware circuitry and software.

Main memory 802 and secondary storage 804 are storage medium.

The program instructions making up the various embodiments may be stored in a storage medium. Moreover, as disclosed herein, the term "storage medium" may represent one or more devices for storing data, including read only memory (ROM), programmable read-only memory (PROM), erasable programmable read-only memory (EPROM), random access memory (RAM), magnetic RAM, core memory, floppy disk, flexible disk, hard disk, magnetic tape, CD-ROM, flash memory devices, a memory card and/or other machine readable mediums for storing information. The term "machine-readable medium" includes, but is not limited to portable or fixed storage devices, optical storage mediums, magnetic mediums, memory chips or cartridges, wireless channels and various other mediums capable of storing, containing or carrying instruction(s) and/or data. A machine-readable medium can be realized by virtualization, and can be a virtual machine readable medium including a virtual machine readable medium in a cloud-based instance.

The storage medium may include a number of software modules that may be implemented as software code to be executed by the processing unit 801 using any suitable computer instruction type. The software code may be stored as a series of instructions or commands, or as a program in the storage medium.

Network interface 805 can be an Ethernet interface, a frame relay interface, a fibre optic interface, a cable interface, a DSL interface, a token ring interface, a serial bus interface, an USB interface, Firewire interface, Peripheral Component Interconnect (PCI) interface, etc.

Network interface 805 may be configured to transmit and/or receive data using a variety of different communication protocol.

Network interface 805 may be implemented by an standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a Digital Subscriber Line (DSL) interface, a token ring interface, a serial bus interface, an USB interface, Firewire interface, Peripheral Component Interconnect (PCI) interface, etc.

The profile server may communicate with a device using a wired or wireless connection through input 806. Input 806 may be an USB interface, a serial bus interface, an Ethernet interface or a cable interface that can provide communications between the device and the profile server. Alternatively, the profile server may wirelessly communicate with the device. Then input 806 may be an interface for wireless communications such as an infrared port interface, radio frequency interface, WiFi interface, Bluetooth interface, etc.

Figure 1A:
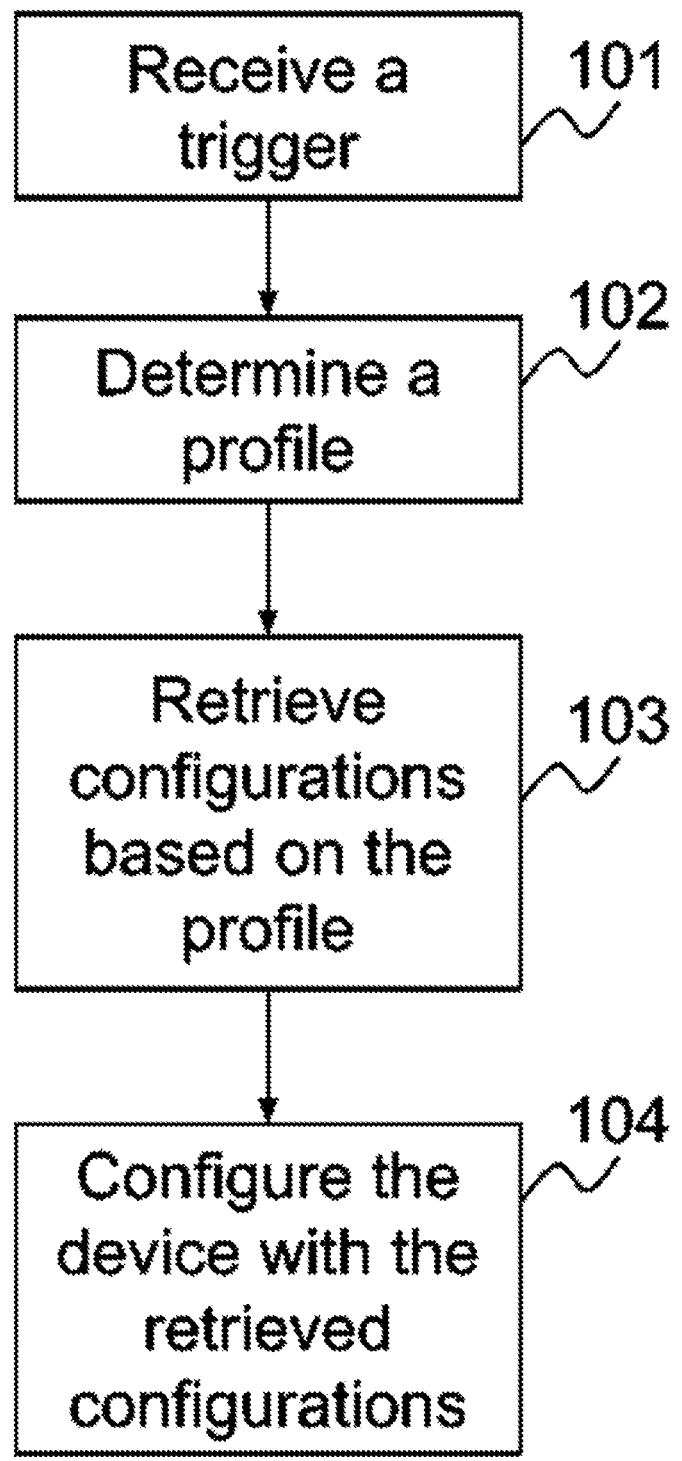
FIG. 1A is a flowchart illustrating a process according to one of the embodiments of the present invention.
Figure 1B:
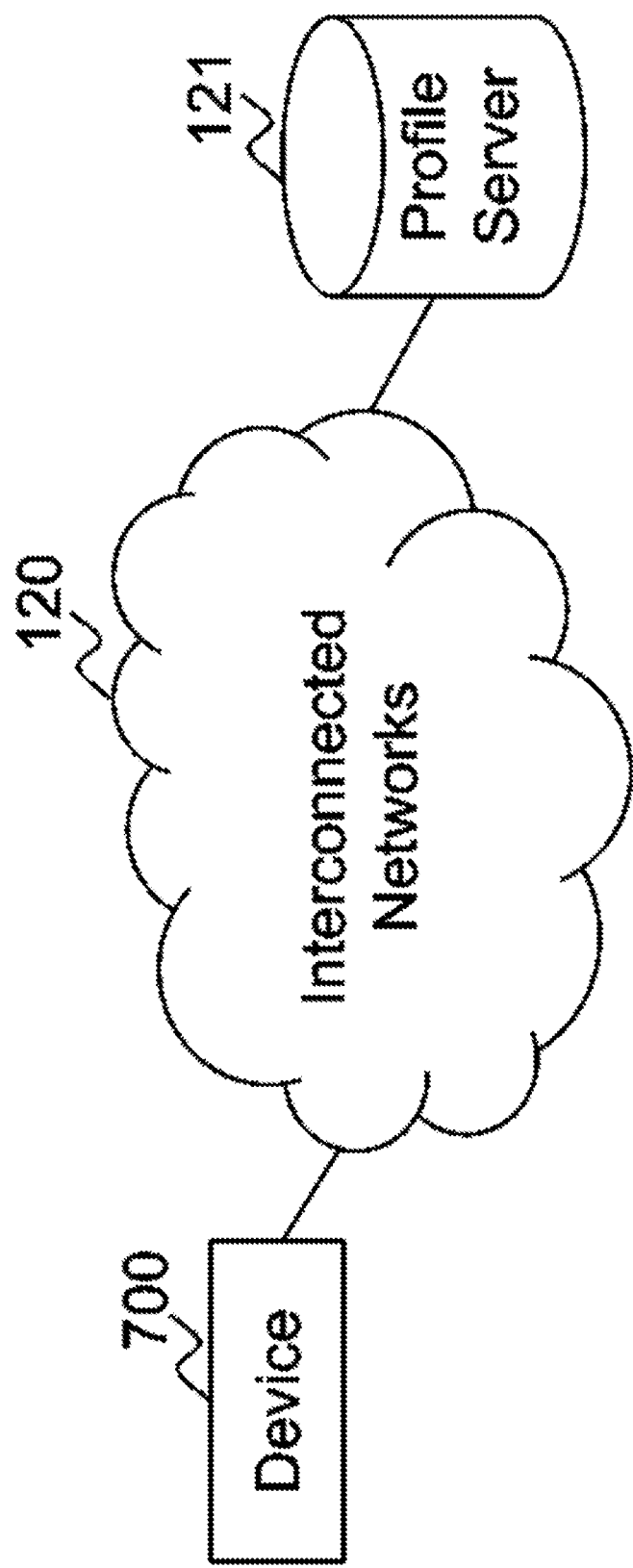
FIG. 1B illustrates a network environment according to various embodiments of the present invention.
Figure 2A:
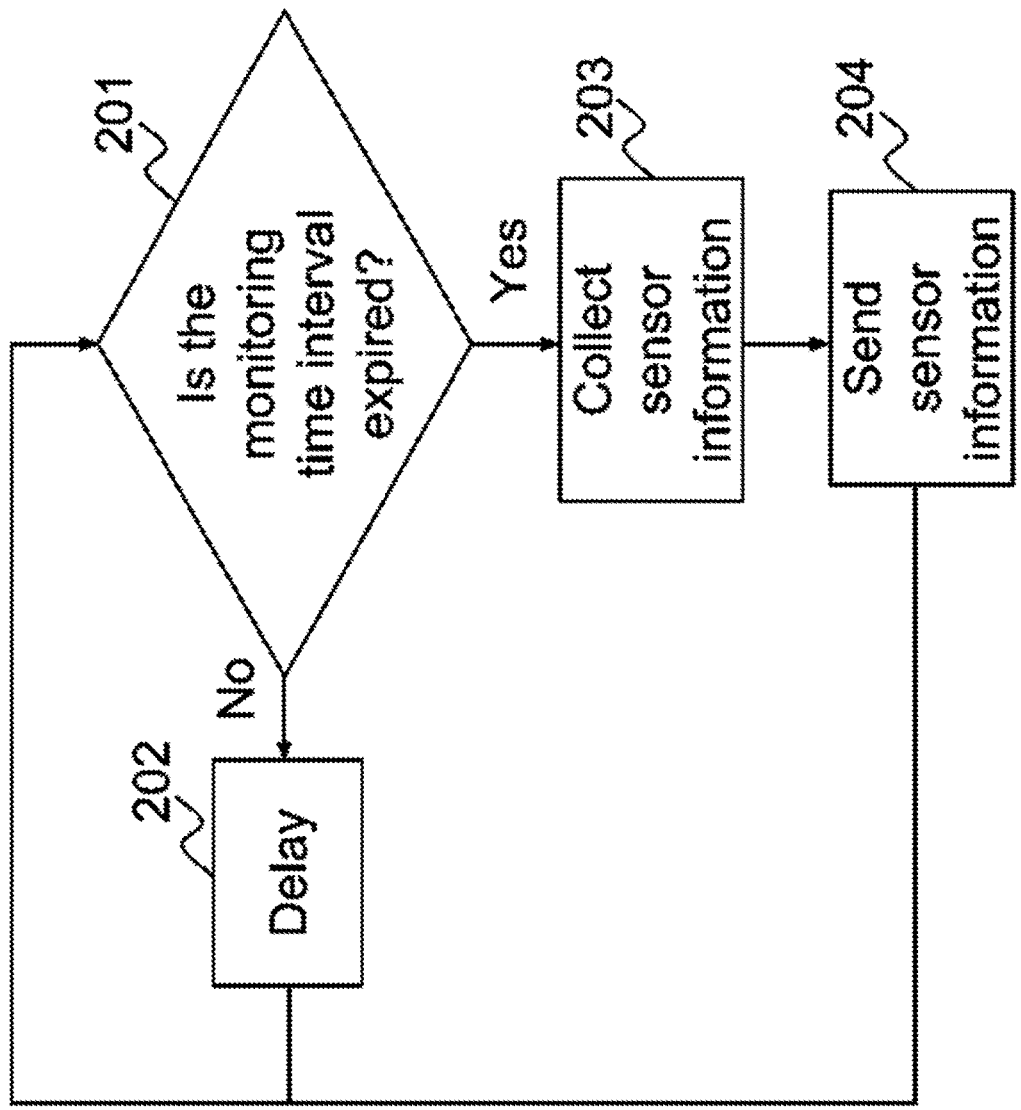
FIG. 2A is a flowchart illustrating a process for receiving a trigger according to one of the embodiments of the present invention.
Figure 2B:
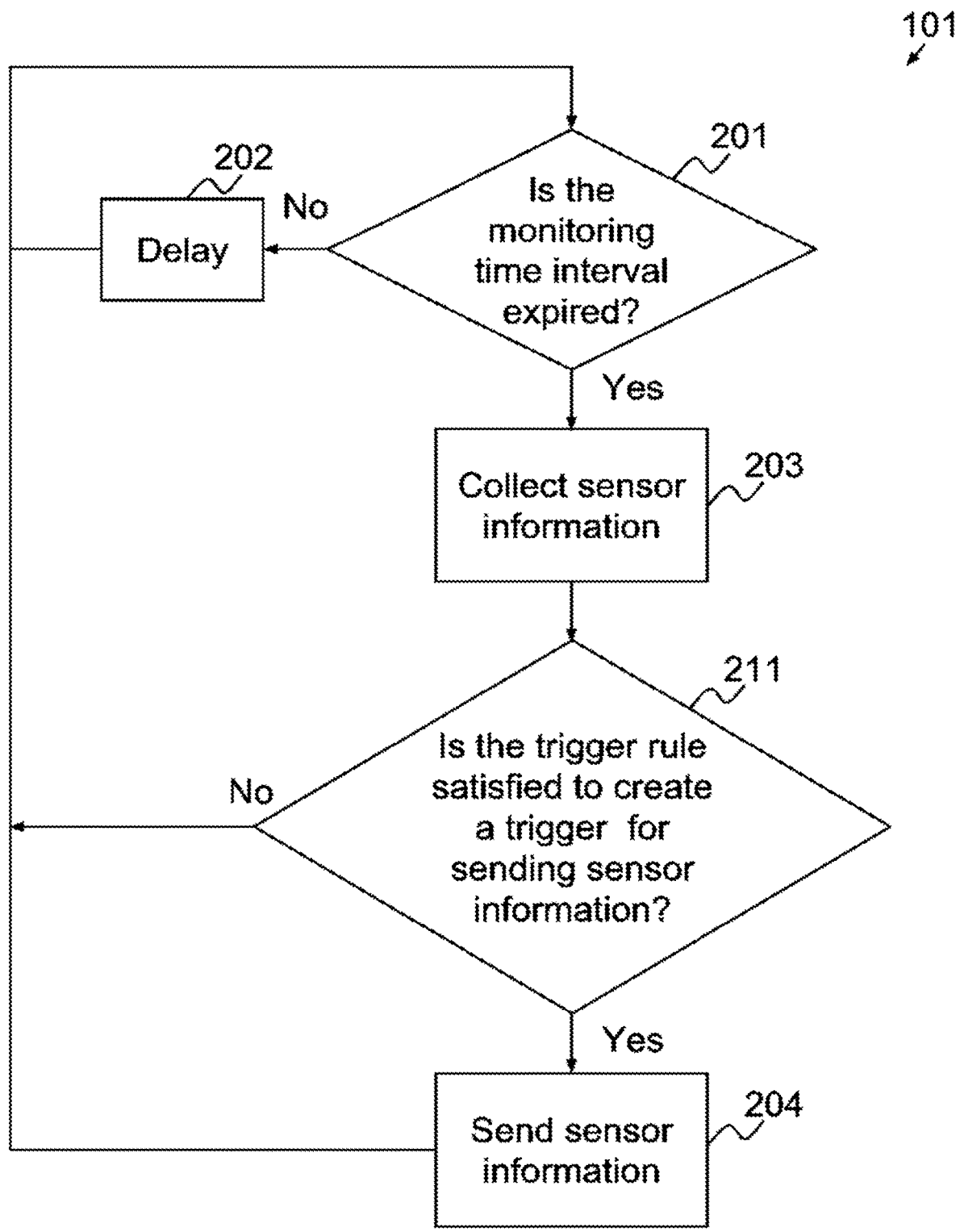
FIG. 2B is a flowchart illustrating a process for receiving a trigger according to one of the embodiments of the present invention.
Figure 2C:
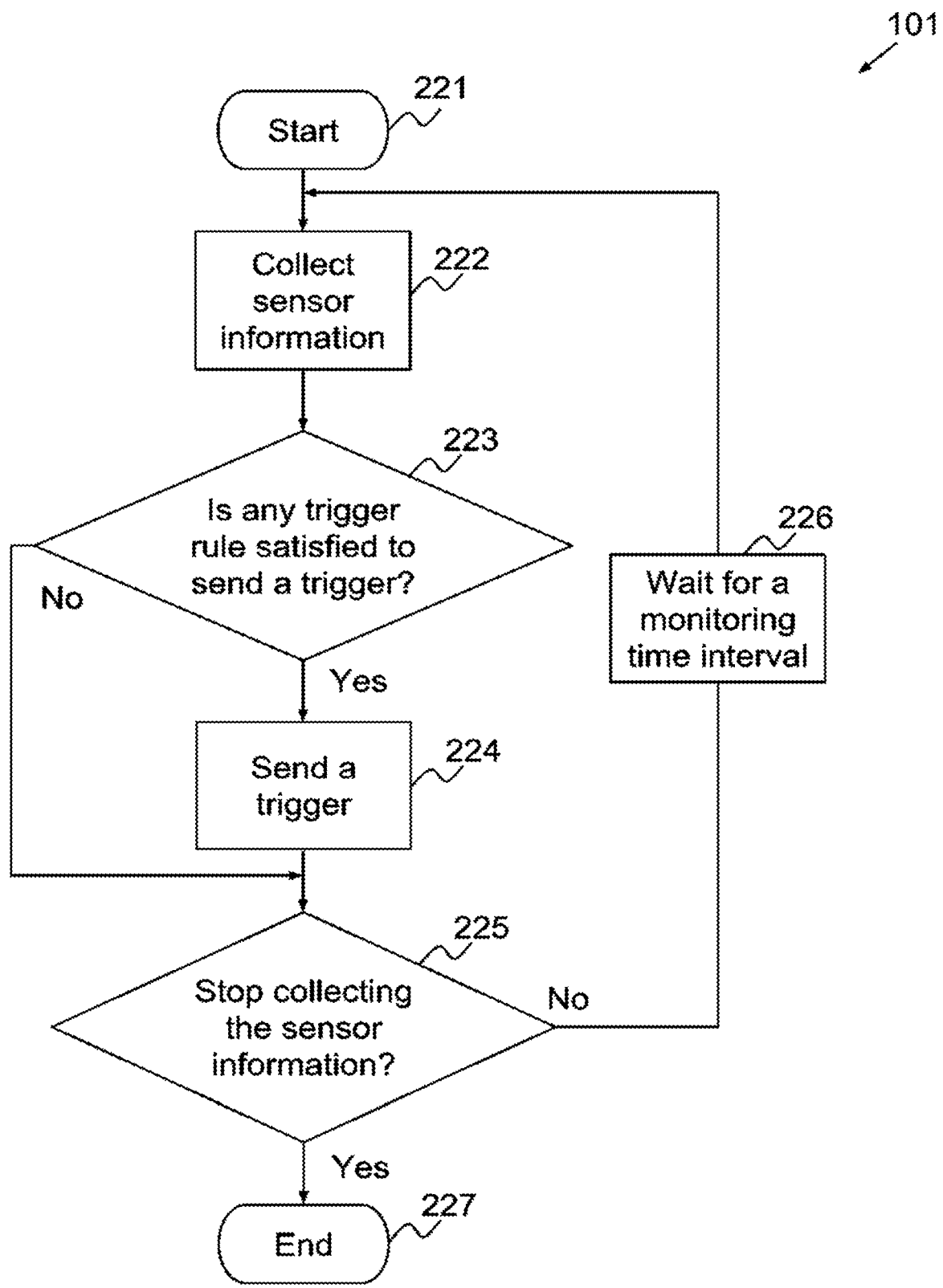
FIG. 2C is a flowchart illustrating a process for receiving a trigger according to one of the embodiments of the present invention.
Figure 3A:
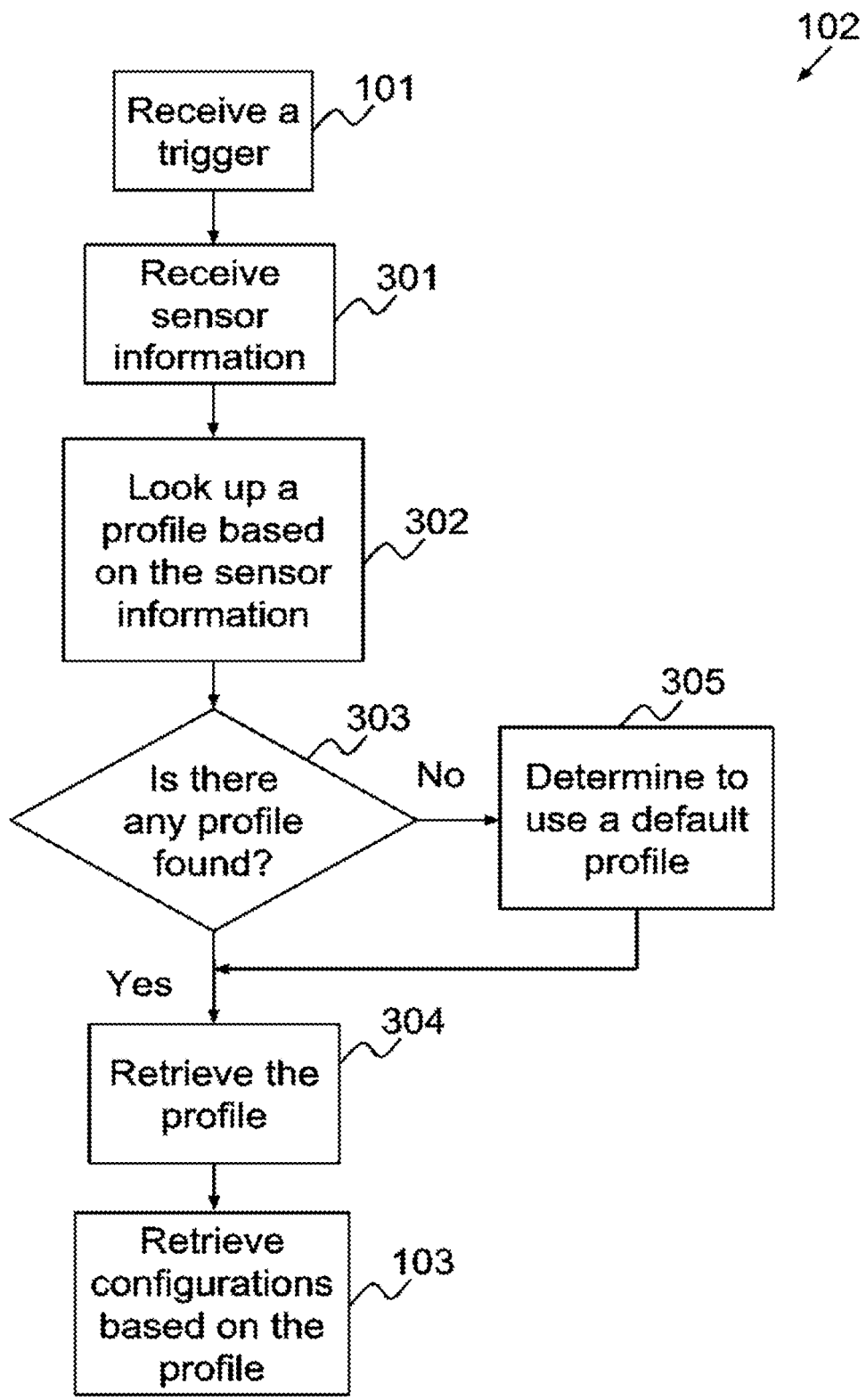
FIG. 3A is a flowchart illustrating a process for determining a profile according to one of the embodiments of the present invention.
Figure 3B:
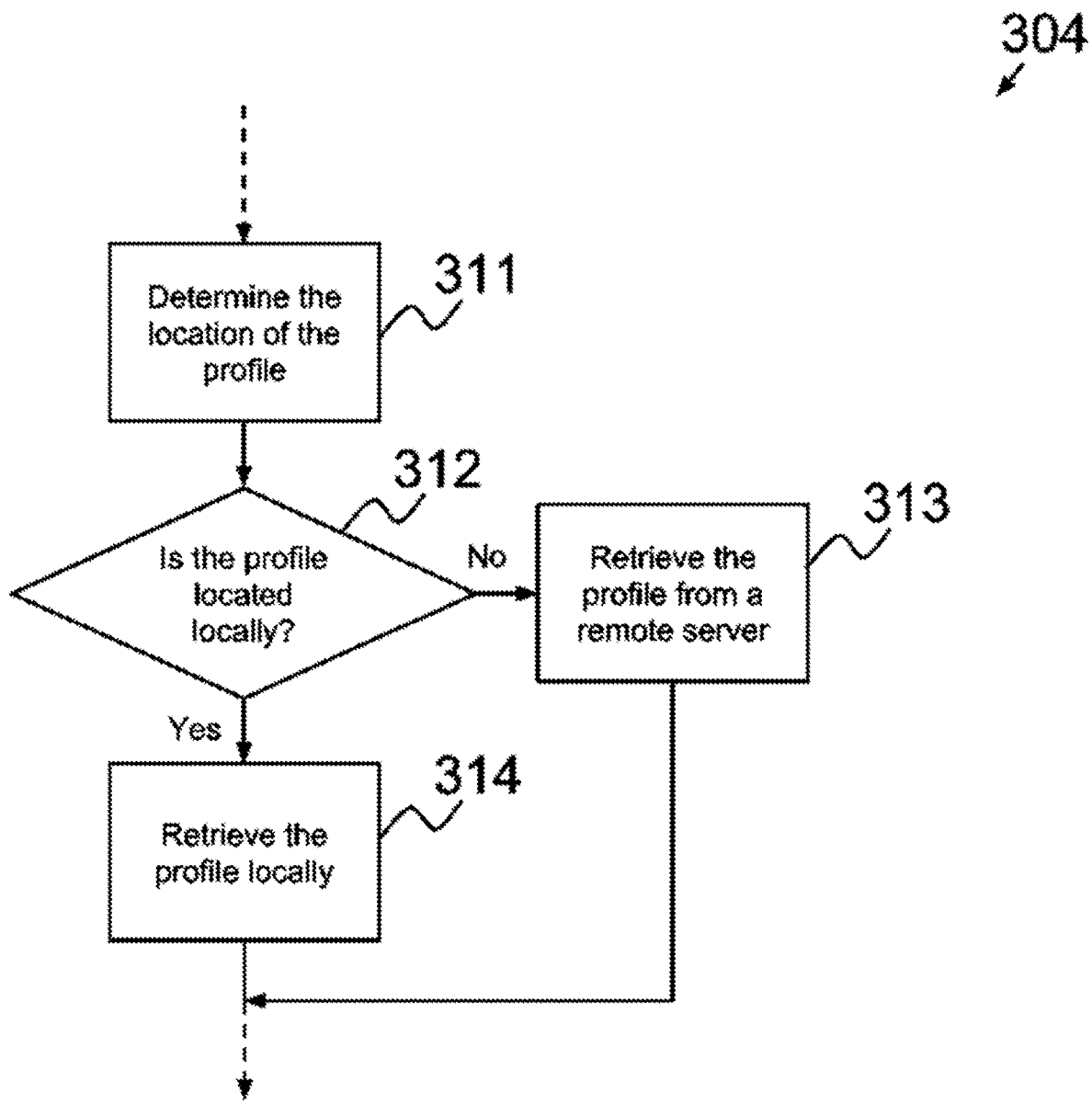
FIG. 3B is a flowchart illustrating one of the embodiments of a sub-process for retrieving a profile corresponding to step 304 in FIG. 3A.
Figure 4:
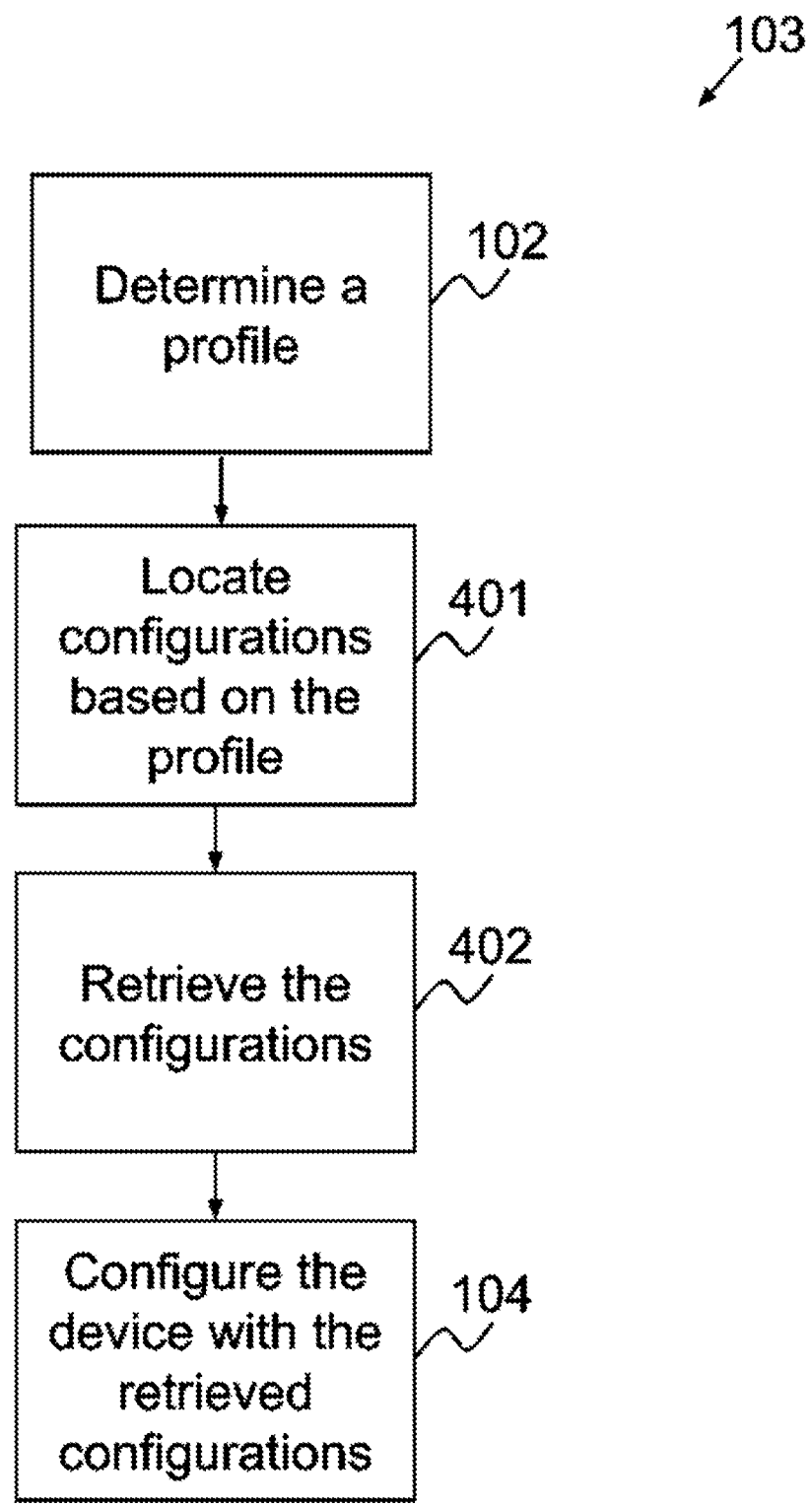
FIG. 4 is a flowchart illustrating a process for retrieving configurations based on a profile according to one of the embodiments of the present invention.
Figure 5:
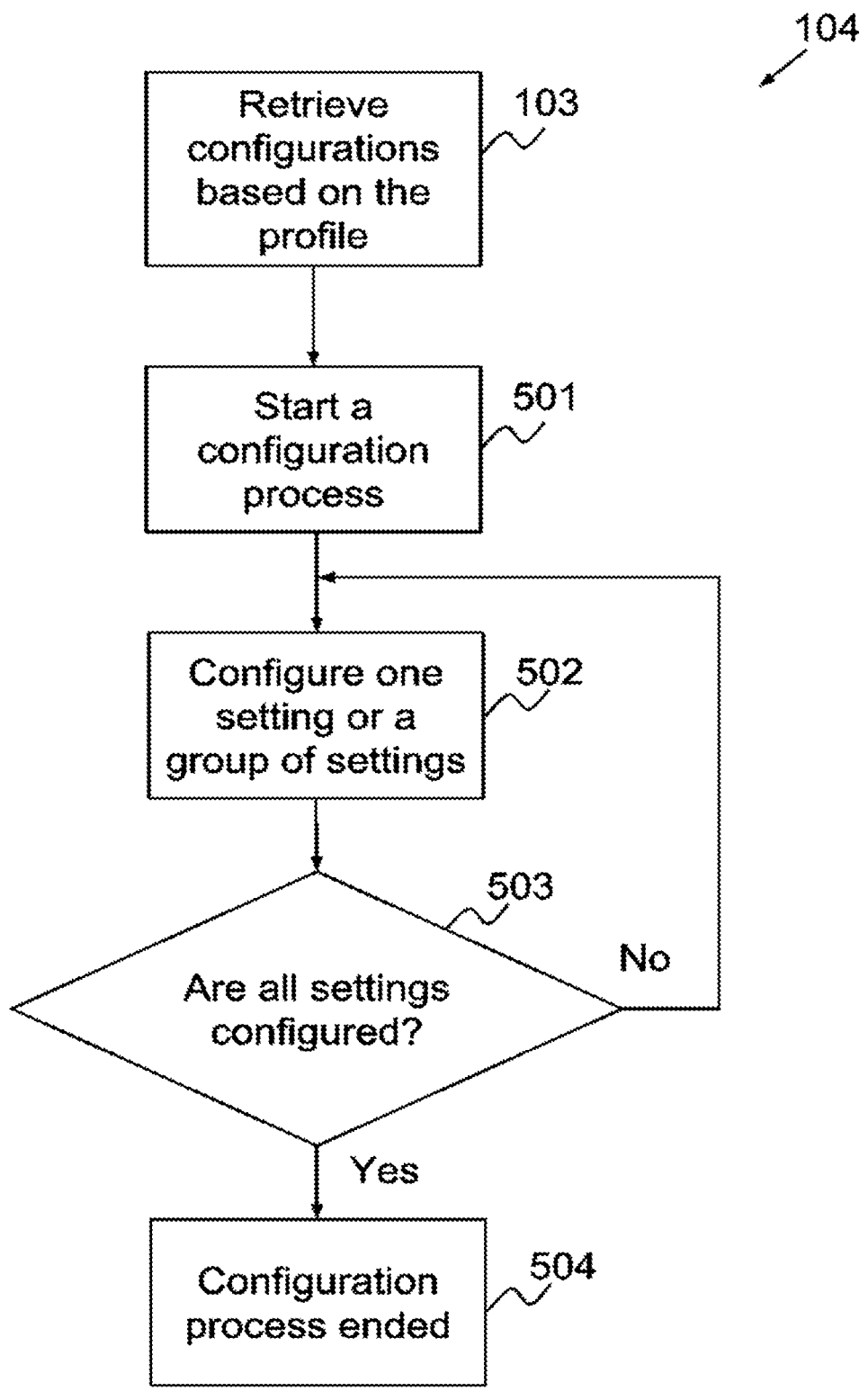
FIG. 5 is a flowchart illustrating a process for configuring a device according to one of the embodiments of the present invention.
Figure 6:
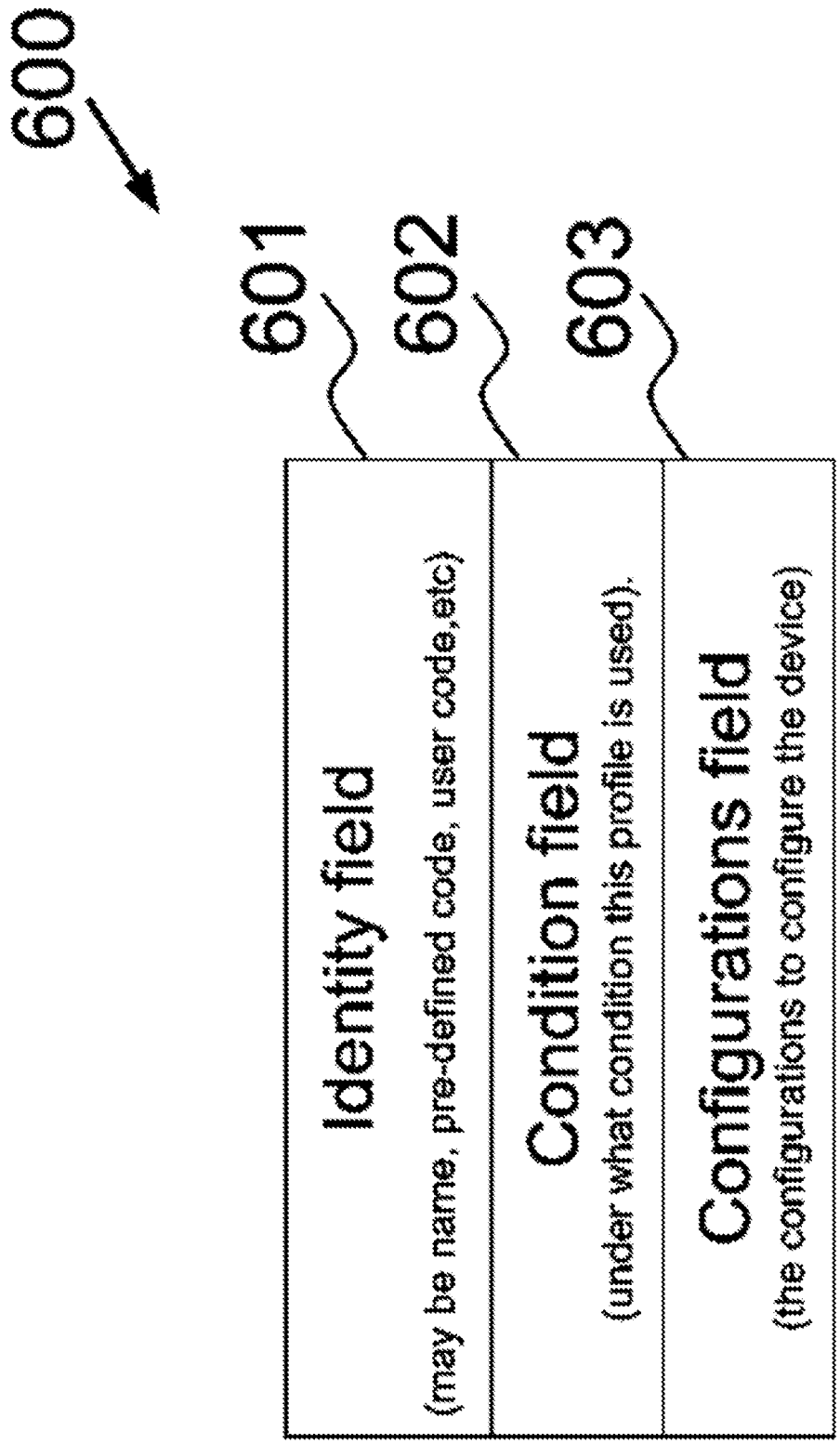
FIG. 6 illustrates the content of a profile according to one of the embodiments of the present invention.
Figure 7:
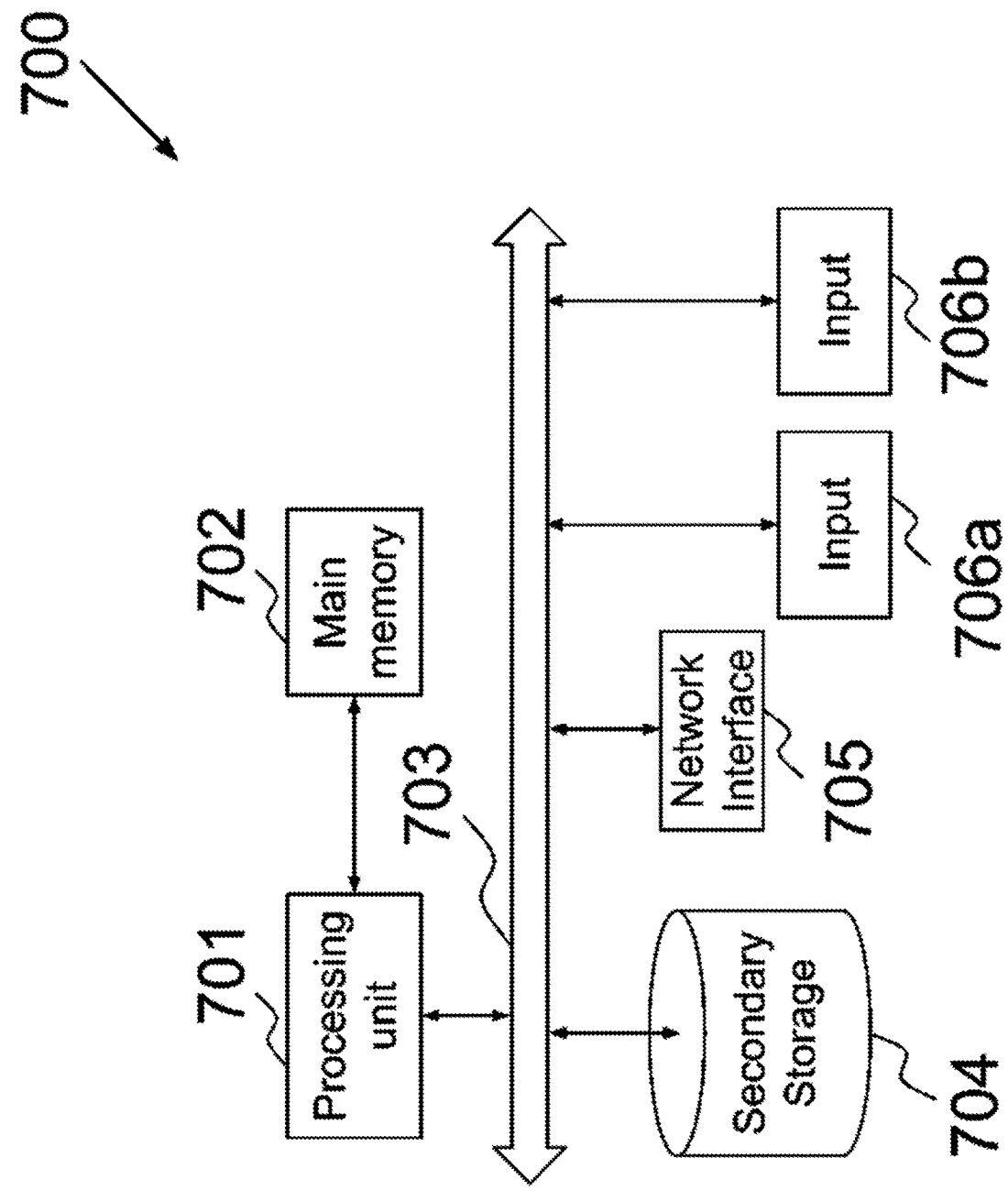
FIG. 7 is an illustrative block diagram of a device according to one of the embodiments of the present invention.
Figure 8:
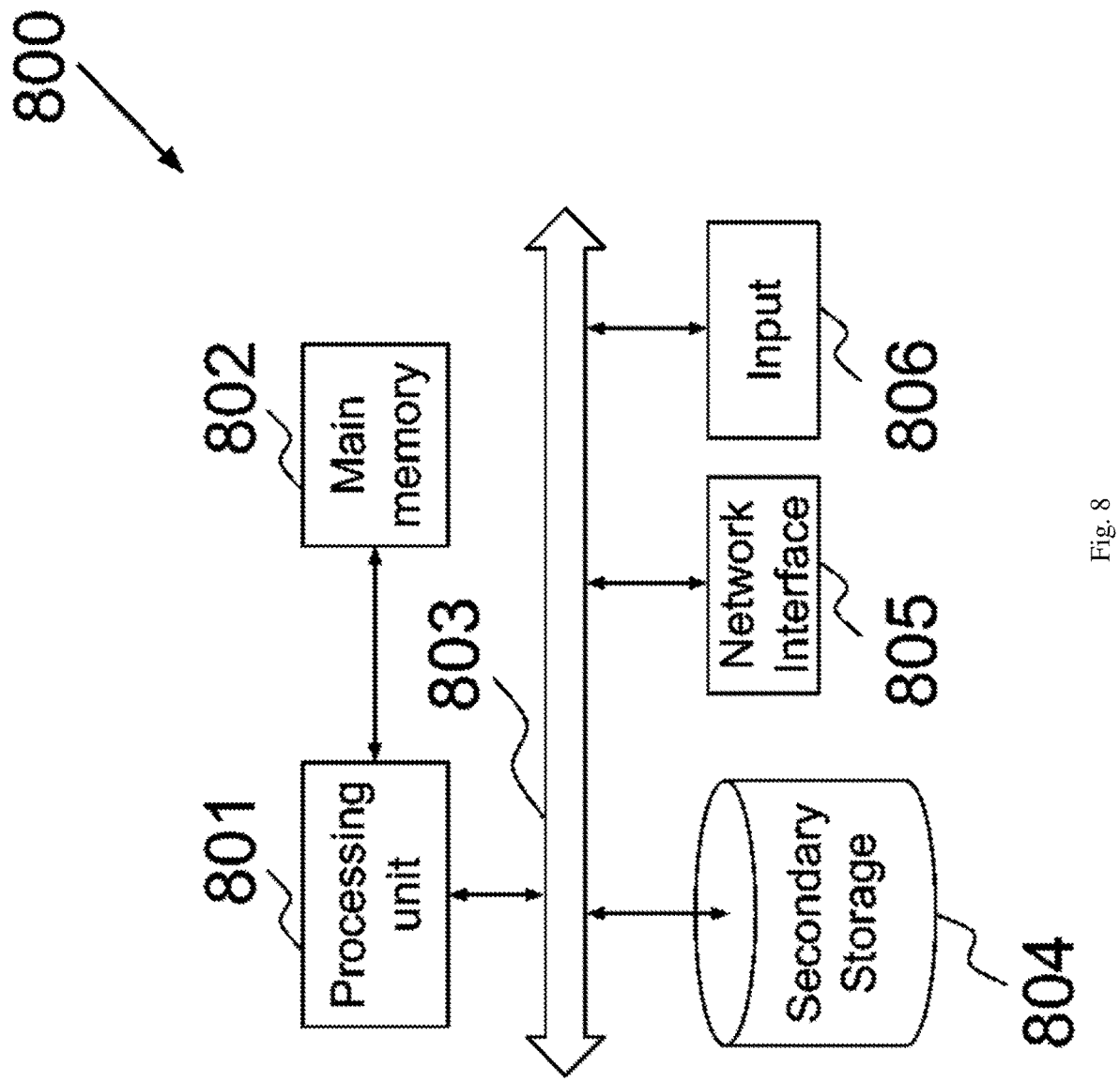
FIG. 8 is an illustrative block diagram of a profile server according to one of the embodiments of the present invention.
Figure 9:
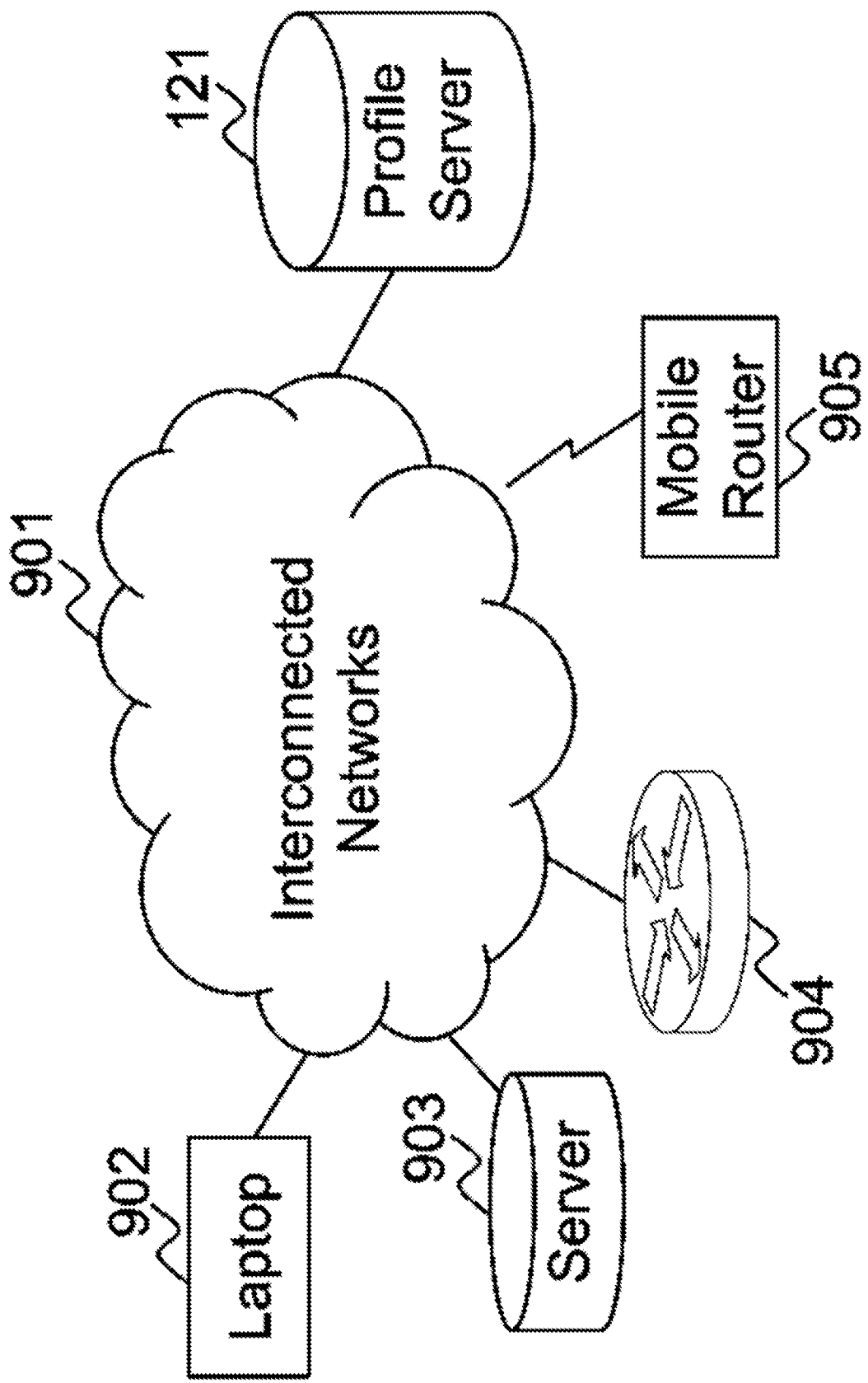
FIG. 9 illustrates a network environment according to various embodiments of the present invention.

The invention claimed is:

1. A method for configuring a mobile router, comprising: when a trigger is received;
   a. receiving sensor information, wherein the sensor information is either location information or network performance information of at least one network connecting to the mobile router;
   b. determining a profile based at least in part on the sensor information;
   c. retrieving a configuration based on the profile; and
   d. configuring the mobile router, based on the configuration, to select at least one SIM card to use,
   wherein the mobile router comprises a plurality of SIM card slots.

2. The method of claim 1, wherein the sensor information is received periodically.

3. The method of claim 1, wherein the trigger is received when a trigger rule is satisfied.

4. The method of claim 1, wherein the sensor information is received from a profile server or from a profile management module of the mobile router.

5. The method of claim 1, wherein the configuration is stored at the mobile router, at a profile server, or at a remote server.

6. The method of claim 1, wherein the trigger is generated by a remote server and is sent to the mobile router via interconnected networks.

7. The method of claim 1, wherein the profile comprises an identity field, a condition field, and a configuration file.

8. A method for configuring a mobile router, comprising:
   a. sending sensor information to a remote server, wherein the sensor information is either location information or network performance information of at least one network connecting to the mobile router; and
   b. when a trigger is received from the remote server:
      i. retrieving a profile;
      ii. retrieving a configuration based on the profile; and
      iii. configuring the mobile router, based on the configuration, to select at least one SIM card to use,
   wherein the mobile router comprises a plurality of SIM card slots.

9. The method of claim 8, wherein the sensor information is sent to the remote server periodically.

10. The method of claim 8, wherein the trigger is received when a trigger rule is satisfied.

11. The method of claim 8, wherein the configuration is stored at the mobile router, at a profile server, or at a remote server.

12. The method of claim 9, wherein the profile comprises an identity field, a condition field, and a configuration file.

13. A method for connecting a mobile router to an interconnected network, comprising:
   a. at the mobile router, sending sensor information to a profile server periodically;
   b. at the profile server, determining whether to generate a trigger based on sensor information;
   c. at the profile server, when a trigger is generated, selecting a profile and sending the profile to the mobile router;
   d. at the mobile router, receiving the profile;
   e. at the mobile router, retrieving a configuration based on the profile;
   f. at the mobile router, configuring the mobile router based on the configuration; and
   g. at the mobile router, transmitting and receiving data based on the configuration, wherein the mobile router comprises a plurality of SIM card slots.

14. The method of claim 13, wherein the configuration is retrieved from the profile server if the configuration is not already at the mobile router.

15. The method of claim 13, wherein the configuration is to configure the remote server to stop using one SIM card and to start using another SIM card.

16. The method of claim 13, wherein the profile comprises an identity field, a condition field, and a configuration file.

17. The method of claim 13, wherein the sensor information is selected from a group consisting of location information, network availability information, and latency change to a specific Internet Protocol (IP) address.

18. The method of claim 13, wherein the profile server is located remotely from the mobile router.

19. The method of claim 13, wherein the profile server is a module at the mobile router.

20. The method of claim 13, wherein the configuration comprises bandwidth limitation to specific websites.

* * * * *